(12) United States Patent
Lynn et al.

(10) Patent No.: US 9,107,444 B2
(45) Date of Patent: Aug. 18, 2015

(54) METHOD AND APPARATUS FOR FLASH FROZEN DRINKS MIXES

(76) Inventors: Robert Lynn, Nashville, TN (US); Curt Jones, Nashville, TN (US)

(*) Notice: Subject to any disclaimer, the term of this patent is extended or adjusted under 35 U.S.C. 154(b) by 1200 days.

(21) Appl. No.: 12/800,427

(22) Filed: May 14, 2010

(65) Prior Publication Data

US 2010/0287951 A1   Nov. 18, 2010

Related U.S. Application Data

(60) Provisional application No. 61/216,174, filed on May 14, 2009.

(51) Int. Cl.
| | |
|---|---|
| A23L 3/36 | (2006.01) |
| A23L 3/375 | (2006.01) |
| A23L 2/02 | (2006.01) |
| A23L 2/385 | (2006.01) |
| A23L 2/56 | (2006.01) |
| A23L 2/60 | (2006.01) |
| C12G 3/00 | (2006.01) |
| C12G 3/06 | (2006.01) |

(52) U.S. Cl.
CPC . *A23L 3/375* (2013.01); *A23L 2/02* (2013.01); *A23L 2/385* (2013.01); *A23L 2/56* (2013.01); *A23L 2/60* (2013.01); *A23L 3/36* (2013.01); *C12G 3/005* (2013.01); *C12G 3/06* (2013.01)

(58) Field of Classification Search
CPC .......................................................... A23L 3/375
USPC ......................................... 62/1; 426/592, 418
See application file for complete search history.

(56) References Cited

U.S. PATENT DOCUMENTS

| | | | | |
|---|---|---|---|---|
| 5,126,156 | A * | 6/1992 | Jones ............................ | 426/418 |
| 6,000,229 | A * | 12/1999 | Jones et al. ...................... | 62/74 |
| 6,209,329 | B1* | 4/2001 | Jones et al. ...................... | 62/74 |
| 6,494,049 | B1* | 12/2002 | Jones et al. ...................... | 62/74 |
| 6,555,154 | B2* | 4/2003 | Jones et al. .................... | 426/524 |
| 2002/0189268 | A1* | 12/2002 | Jones et al. ..................... | 62/135 |
| 2003/0129282 | A1* | 7/2003 | Solorio et al. ................ | 426/102 |
| 2003/0145734 | A1* | 8/2003 | Ervin .......................... | 99/275 |
| 2006/0093719 | A1* | 5/2006 | Nelson .......................... | 426/524 |
| 2007/0134394 | A1* | 6/2007 | Jones ........................... | 426/565 |
| 2007/0248736 | A1* | 10/2007 | Masuda et al. ................ | 426/592 |
| 2008/0138487 | A1* | 6/2008 | Jones ............................ | 426/583 |
| 2009/0077980 | A1* | 3/2009 | Jones ................................. | 62/1 |
| 2009/0277186 | A1* | 11/2009 | Jones ................................. | 62/1 |

* cited by examiner

*Primary Examiner* — Frantz Jules
*Assistant Examiner* — Emmanuel Duke
(74) *Attorney, Agent, or Firm* — Stockwell & Smedley, PSC

(57) ABSTRACT

Embodiments of the present invention relate to a system and method that formulates a drink mixer according to a predetermined recipe and then flash freezing the mix into the form of small frozen pellets. The pellets are used by a person to make one drink or a batch of drinks by mixing a base beverage, or beverages, with the pellets.

11 Claims, 3 Drawing Sheets

METHOD AND APPARATUS FOR FLASH FROZEN DRINKS MIXES

FIELD OF THE INVENTION

The present invention relates to beverages and more particularly to an apparatus and method for creating flash frozen drink mixes.

BACKGROUND OF THE INVENTION

There are a great variety of beverage choices available today for the ordinary consumer. However, even in view of this variety of choices, mixing different flavors together expands the choices even more. One area where this is especially true is in the field of alcoholic beverages. While there are many different types of distilled spirits, having a variety flavors, many people enjoy mixing these spirits with other flavors to concoct mixed drinks.

To simplify the making of mixed drinks, there are premixed recipes of liquid "mixers" which a person can purchase. The mixers are typically non-alcoholic in nature and are formulated in the correct ratios such that they can be combined with one or more alcoholic beverages to make a mixed drink. However, many of these mixers require ice cubes, a blender, additional containers, and a power source to be readily available in order to make the mixed drink. Because of these requirements, the convenience of having re-formulated mixers is offset by another, new set of inconveniences.

Thus, there remains a need for a method and apparatus that allows making mixed drinks in a manner that is easier, simpler, and more convenient than presently known methods.

SUMMARY OF THE INVENTION

Embodiments of the present invention relate to a system and method that formulates a drink mixer according to a predetermined recipe and then flash freezing the mix into the form of small frozen pellets. The pellets are used by a person to make one drink or a batch of drinks by mixing a base beverage, or beverages, with the pellets.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION OF THE PREFERRED EMBODIMENTS

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

As a result of the methods described herein, there are provided formulations of a frozen drink mixes in the form of small particulate shapes that remain free-flowing during storage. The particulate shapes, generally referred to as "beads", may have a generally spherical, spheroid shape but may also have an oblong, elliptical, oblate, tubular, or other slightly irregular shape. In addition to having an irregular overall shape, the surface of the particulate shape may also be either smooth or irregular (e.g. bumpy, pocked, etc.). On average, the particulate shapes will preferably have a diameter of about 5 mm or less but can also be larger such as between about 6 and about 10 mm. Particulate shapes having diameters outside these ranges are also contemplated. For non-spherical shapes which do not have a conventional diameter, the diameter is considered to be the diameter of the smallest sphere into which the particulate shape would fit.

It is desired that the particulate or beaded product is in a free-flowing format so that it is readily pourable. Free-flowing, as used herein, is a broad term which includes the ability of the product to flow as individual particulate shapes, with little or no clumping or sticking to each other, during such pouring. There may be slight sticking after a period of storage, but a light tap on the container will unstick the particulate shapes and allow them to be free flowing. The generally spherical shape helps contribute to the free-flowing, pourable product.

Figure 1:
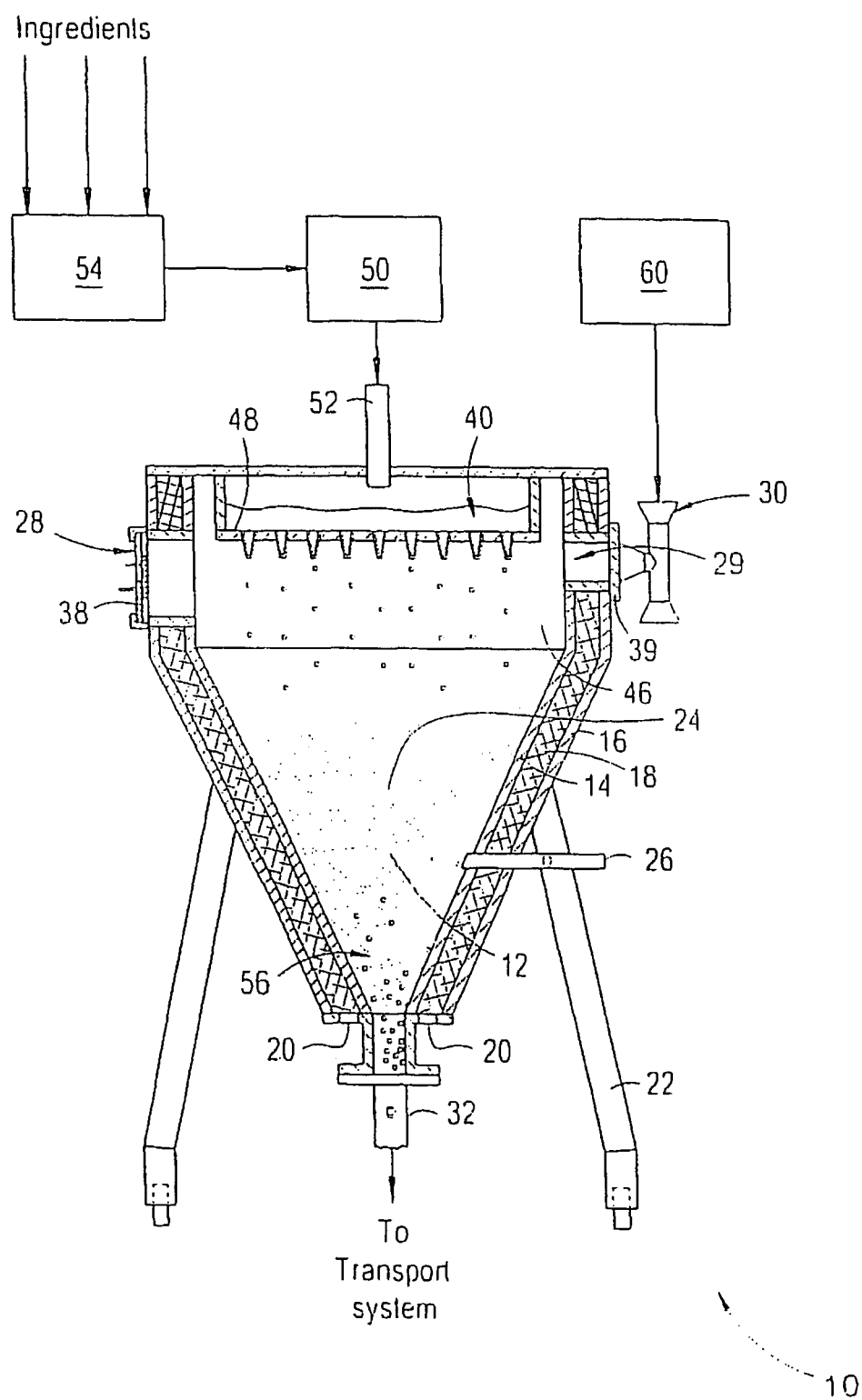
FIG. 1 depicts flash freezing apparatus in accordance with the principles of the present invention.

FIG. 1 shows a cryogenic processor constructed in accordance with the preferred embodiment of the present invention to produce free-flowing beads 56. The fundamental method utilized to produce the product is described in detail in U.S. Pat. No. 5,126,156, which is hereby incorporated by reference in its entirety.

A cryogenic processor 10 includes a freezing chamber 12 that is most preferably in the form of a conical tank that holds a liquid refrigerant therein. A freezing chamber 12 incorporates an inner shell 14 and an outer shell 16. Insulation 18 is disposed between the inner shell 14 and outer shell 16 in order to increase the thermal efficiency of the chamber 12. Vents 20 are also provided to ventilate the insulated area formed between the shells 14 and 16. The freezing chamber 12 is a free-standing unit supported by legs 22.

A refrigerant 24, preferably liquid nitrogen, enters the freezing chamber 12 by means of refrigerant inlet 26. The refrigerant 24 is introduced into a chamber 12 through the inlet 26 in order to maintain a predetermined level of liquid refrigerant in the freezing chamber because some refrigerant 24 can be lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through product outlet 32 adapted at the base of the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48. The viscosity of the liquid composition as well as pressure applied by the pump (if any) can be selected so that the liquid passing through the feed tray does so at a desired rate and speed. For example, beads or pellets of uniform size may me generated or more irregular shaped beads or pellets may be generated. One way in which beads having an irregular shape and/or surface texture may be generated is to increase the speed at which the liquid composition passes through the feed tray 48.

In order to create uniformly sized particles or beads 56 of frozen product, uniformly sized droplets of liquid composition are required to be fed through gas diffusion chamber 46 to freezing chamber 12. The feed tray 48 is designed with feed assembly 40 that forms droplets of the desired character. The frozen product takes the form of beads that are formed when the droplets of liquid composition contact the refrigerant vapor in the gas diffusion chamber 46, and subsequently the liquid refrigerant 24 in the freezing chamber 12. After the beads 56 are formed, they fall or are mechanically directed to the bottom of chamber 12. A transport system connects to the bottom of chamber 12 at outlet 32 to carry the beads 56 to a packaging and distribution network for later delivery and consumption.

The vacuum assembly 30 cooperates with air inlet 28 and adjustment doors 38 so that ambient air flows through the inlet and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. An air source 60, typically in the form of an air compressor, is attached to vacuum assembly 30 to provide appropriate suction to create the ambient air flow required.

Embodiments of the present invention contemplate the liquid composition described above being a liquid drink mixer that is then frozen into beads or pellets. In other words, the above cryogenic freezing apparatus is used to form frozen pellets which can be mixed with a base beverage to create a mixed drink. The pellets or beads can have a variety of different shapes and sizes. For example, a pellet size between about 4 and 10 mm in diameter is contemplated. However, larger and smaller sized pellets are also contemplated. As for texture, the pellets may be relatively uniform spherical beads with a relatively smooth surface. However, a rough surface texture and irregular shaped beads or pellets is beneficial as well. Thus, pellets resembling small asteroids or rocks are contemplated that have a nominal size of about 2 to 12 mm.

As for the base beverage, the typical beverage would be an alcoholic beverage such as a distilled spirit. However, embodiments of the present invention are not limited to only making alcoholic mixed drinks. Thus, the base beverage can include liquids such as coffees, teas, syrups, juices, wines, sodas, water, and combinations thereof in addition to alcoholic beverages.

The liquid composition that makes up the mixer can be any of a wide variety of flavors and components. For example, the liquid composition may include such things as margarita mix, apple martini mix, pina colada mix, mojito mix, sangrita mix, tomato juice, orange juice, fruit juice, vegetable juice, herbs, spices, essence oils, sugar, or salt. Additionally, these elements can be concentrated by extracting a portion of their water volume. This concentrating of elements can be accomplished to change their flavor profile once reconstituted in a mixed drink as well as to create a formulation that is easier to freeze uniformly. Once the liquid composition is appropriately formulated, the next step is to freeze the fluid into the beads as described with respect to FIG. 1. These beads can then be transported to a packaging machine. The transporting of the beads can be accomplished in a variety of different ways such as by a feed screw, a moving conveyor belt, or gravity feed. The transporting means can also be cooled such that the beads remain cool while being transported to the packager.

Once the beads are packaged and delivered to a consumer such as an individual, a bar, a store, or a restaurant, the beads are stored in a conventional freezer until they are used to make a beverage. Although the beads are frozen at cryogenic temperatures, there is no requirement that they remain cooled to temperatures as low as −40 degrees but, instead, may be maintained at the standard operating temperatures of commercial and consumer freezers.

The ultimate use for the frozen beads is to use them to produce a beverage for consumption. This can be accomplished in a variety of different ways without departing from the scope of the present invention. When a mixed drink is desired, the end consumer can remove a desired portion of the pellets from its package and combine that portion with an appropriate portion of a base beverage. Thus, without a blender or ice-cubes, a mixed drink can be made with ease, especially a "frozen" mixed drink such as a margarita or pina colada. Such mixed drinks can be made in a variety of sizes without departing from the scope of the present invention. Additionally, the use of the frozen beads to cool a mixed drink can eliminate the need for ice cubes and thereby result in a more flavorful drink that does not get watered down as the ice melts.

It is contemplated that a single pellet flavor would include all the components of a particular drink mixer. For example, each pellet of a margarita pelletized mixer would include all the non-alcohol flavors for that drink. However, in other embodiments, each pellet may have a single flavor component and different pellets are combined in appropriate proportions to make the pelletized mixer. Additionally, some non-alcoholic components of a mixed drink may be omitted from the pelletized mixer. For example, a frozen pelletized mixer may omit the club soda flavor such that to create the mixed drink, the mixer is combined with alcohol and with club soda.

Figure 2:
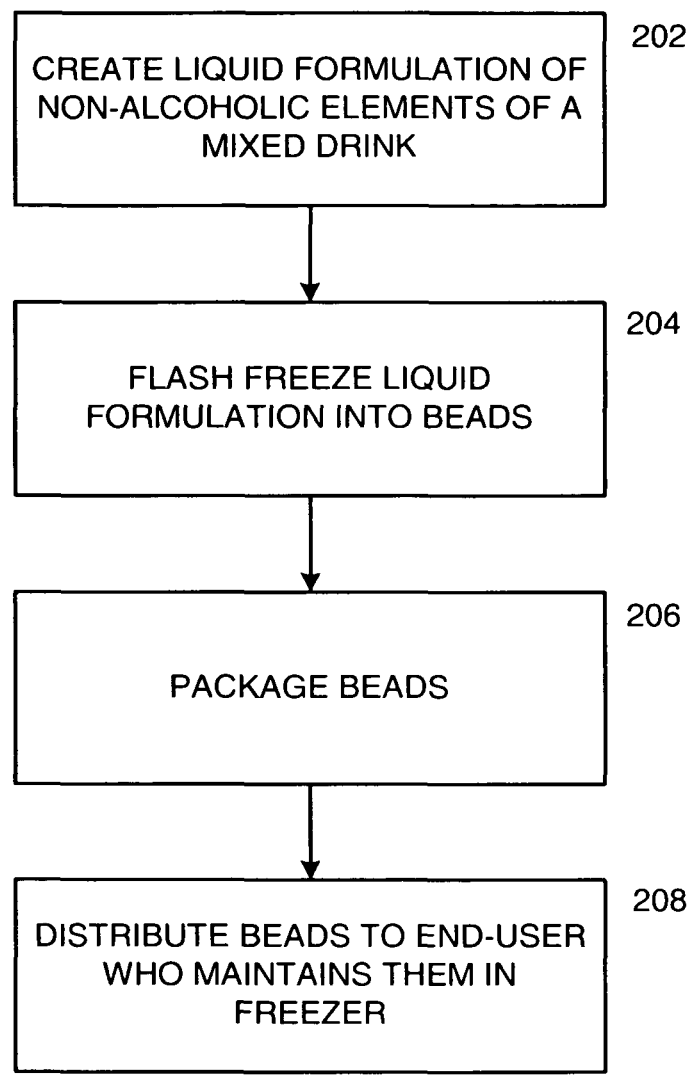
FIG. 2 depicts a flowchart of an exemplary method for making flash frozen mixed drink beads in accordance with the principles of the present invention.

FIG. 2 depicts an exemplary flowchart outlining the steps described above for making flash frozen mixed drink beads in accordance with the principles of the present invention. In step 202 a liquid formulation is made that is to be flash frozen into beads. As discussed the liquid formulation can include one or more liquid components as well as other granular or non-liquid elements that are suspended or dissolved within the liquid formulation. Also the liquid formulation can be a composite of many different flavors or it can be a single flavor formulation. Even for single-flavor formulations, other ingredients that do not add flavor but add body or different freezing characteristics can be included as well. The term "liquid" is intended to encompass a mixture that can flow whether using gravity or pressure. Thus semi-frozen mixes or mixes having a similar consistency are also contemplated within the scope of the present invention.

In step 204 the liquid formulation is flash frozen into beads. The exemplary device of FIG. 1 is one method of creating such flash frozen beads but one of ordinary skill will recognize that other methods and techniques can be used as well. Once frozen, the beads can be packaged, in step 206. The beads can be packaged in a variety of ways such as single-flavored or multi-flavored beads being packaged in their own separate packaging; however other alternatives are contemplated. For example, a mix of single-flavor beads can be created by mixing in desired proportions the separate component flavor beads to create a drink mixer having a desired complex flavor. Also, multi-flavored beads can be mixed with single-flavor beads or other multi-flavored beads. Different flavor beads of different sizes can also be mixed together without departing from the scope of the present invention. The size of the packaging can vary as well. For example, individual drink mixers can be packaged separately or a larger size package can be used that is capable of making multiple mixed drinks.

In step 208, the packaged frozen drink mixer beads are distributed to an end user such as a grocery store, an individual, a restaurant, or a commercial establishment. The beads are stored in a conventional freezer until used. In the larger packages, the appropriate amount of beads can be extracted for a desired number of drinks and the package returned to the freezer.

Figure 3:
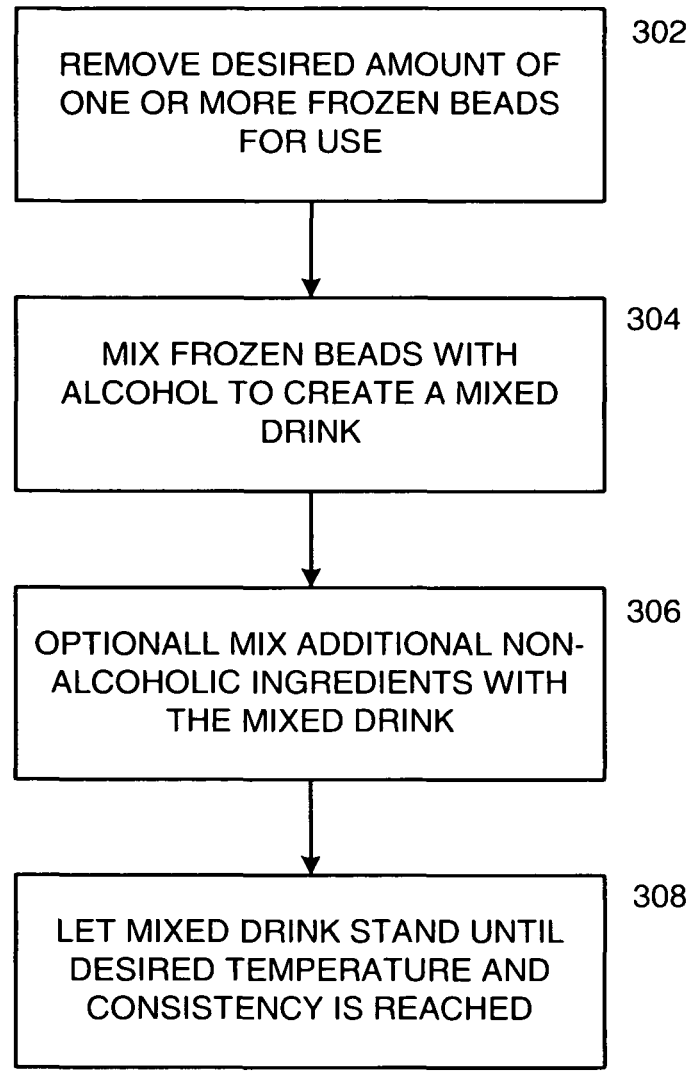
FIG. 3 depicts a flowchart of an exemplary method of making a mixed drink in accordance with the principles of the present invention.

FIG. 3 depicts a flowchart of an exemplary method for making a mixed drink in accordance with the principles of the present invention. In step 302, a user removes a desired amount of frozen beads for making a mixed drink. For example, the user could simply remove the desired amount of a multi-flavored bead or remove a desired amount of a bead mix that is substantially a homogenous mixture of one or more differently flavored beads. Alternatively, the user could mix and match different flavored beads to concoct a mixed drink having a desired flavor.

In step 304, the beads are mixed with one or more alcohol components to create a mixed drink. Optionally, in step 306, additional non-alcoholic ingredients can also be added to modify the mixed drink. For example, fresh squeezed lime juice could be added in order to capture a fresh citrus flavor. Also, ice cream or similar frozen foods can be added as well. The actual mixing of the drink can be accomplished using conventional mixing methods appropriate for each type of drink that is being created. Some drinks are vigorously shaken, while others are gently stirred.

In step 308, the mixed drink is permitted to rest until the desired consistency and temperature of the drink is achieved. Some drinks benefit from being smooth and homogenous in texture; others, however, are better served while slushy or semi-frozen. Embodiments of the present invention also contemplate relatively large applications of mixed drinks. For example, at a gathering with dozens or hundreds of people, margaritas might be appropriate. Rather than making each drink individually or making a large mix and waiting for it to freeze, the frozen beads of the present invention can be utilized. For example, an appropriate amount of drink mixer beads can be added to a desired amount of alcohol to make a mix that can be used for multiple individual drinks. If this mix is kept in a container that can maintain the drinks slushy texture, then a fresh margarita (for example) can be easily and quickly poured for numerous people across a relatively long span of time such as an hour or more.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for manufacturing a mixed drink, comprising:
combining one or more non-alcoholic ingredients to form a liquid mix formulation;
cryogenically freezing the liquid mix formulation to form a plurality of cryogenically frozen beads of the liquid mix formulation by dripping the liquid mix formulation into liquid nitrogen;
combining the plurality of cryogenically frozen beads with a first alcoholic liquid to form the mixed drink without blending or ice;
combining one or more non-alcoholic ingredients to form an additional liquid mix formulation;
cryogenically freezing the additional liquid mix formulation to form an additional plurality of cryogenically frozen beads of the additional liquid mix formulation by dripping the additional liquid mix formulation into liquid nitrogen; and
combining the additional plurality of frozen beads with the mixed drink.

2. The method of claim 1, wherein the liquid mix formulation includes more than one flavor component.

3. The method of claim 1, wherein the liquid mix formulation includes only a single flavor component.

4. The method of claim 1, further comprising packaging the cryogenically frozen beads of the liquid formulation.

5. The method of claim 1,
wherein the liquid mix formulation includes one or more of the following ingredients: tomato juice, orange juice, fruit juice, vegetable juice, herbs, spices, essence oils, sugar, and salt.

6. A mixed drink made according to the method of claim 1.

7. The method of claim 1, wherein the flavor of the liquid mix formulation is a composite of multiple individual flavors.

8. The mixed drink of claim 6,
wherein the plurality of cryogenically frozen beads include a first portion having a first flavor and a second portion having a second flavor, wherein the first and second flavors are different from each other.

9. The method of claim 1, wherein the liquid mix formulation and the additional liquid mix formulation have different flavors.

10. The method of claim 1, comprising:
packaging the plurality of cryogenically frozen beads and the additional plurality of cryogenically frozen beads by combining the additional plurality of cryogenically frozen beads with the cryogenically frozen beads into a same package to provide a combined plurality of cryogenically frozen beads in the package.

11. The method of claim 10, further comprising:

mixing the combined plurality of cryogenically frozen beads with an alcohol component to form the mixed drink.

\* \* \* \* \*